Figure 1A:
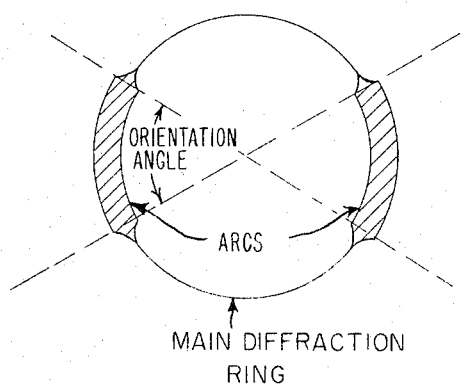

Sept. 27, 1966  M. F. BECHTOLD  3,275,612
BIAXIALLY ORIENTED FILM OF ACRYLONITRILE
POLYMERS AND PROCESS
Original Filed June 2, 1958

TYPICAL DENSITOMETER TRACE TAKEN AROUND
THE MAIN DIFFRACTION RING.

INVENTOR
MAX FREDRICK BECHTOLD

BY *A. Ralph Snyder*
ATTORNEY

United States Patent Office 3,275,612
Patented Sept. 27, 1966

3,275,612
BIAXIALLY ORIENTED FILM OF ACRYLONITRILE POLYMERS AND PROCESS
Max Fredrick Bechtold, Kennett Square, Pa., assignor to E. I. du Pont de Nemours and Company, Wilmington, Del., a corporation of Delaware
Original application June 2, 1958, Ser. No. 739,181. Divided and this application May 22, 1962, Ser. No. 198,409
2 Claims. (Cl. 260—88.7)

This invention relates to pellicular structures of a polyacrylonitrile, and more particularly to a process for preparing tough, oriented films from acrylonitrile polymers, and to the films produced by such process.

This application is a division of my copending application Serial No. 739,181, filed June 2, 1958, now abandoned, which in turn is a continuation-in-part of my application Serial No. 383,374, filed September 30, 1953, now Patent No. 2,846,727, which is a continuation-in-part of my application Serial No. 231,273, filed June 12, 1951, now abandoned.

The need for preparing an oriented polyacrylonitrile film by elongating (by stretching) the film in at least one, and preferably in both directions of the film, is quite apparent from examination of unoriented polyacrylonitrile films formed by such techniques as direct casting from organic or inorganic solutions of the polymer. Such unoriented polyacrylonitrile films, while possessing many desirable physical and chemical properties, are much too brittle to be useful in any relatively wide variety of end uses to warrant anyone's venturing into commercial production of such a product.

In the art relating to the production of fibers and filaments of polyacrylonitrile, much technical information has been published about processing techniques for forming and stretching such fibers and filaments. Such published information has casually been applied to films. Thus, published teachings relating to stretching or drawing of polyacrylonitrile filaments indicate that the same techniques may be applied to stretching of films in one direction, and, in fact, an essentially dry polyacrylonitrile film can be stretched in one direction. However, such a film cannot be stretched biaxially to the extent necessary for significantly improving its physical properties without fibrillating the film (fibrillating means causing the film to split into a multiplicity of thin parallel sections, e.g., filaments or threads). It is also true that biaxial stretching of wet polyacrylonitrile films, i.e., wet or thoroughly soaked with water or organic liquids which are not solvents for the polymer, produces a film with an inherent tendency to fibrillate when the film is dried. Unfortunately, films which exhibit any tendency to fibrillate when subjected to tension or flexing are substantially useless except for their use as an intermediate for producing filaments or very narrow ribbons.

An object of the present invention, therefore, is to provide a process for forming and stretching films formed from acrylonitrile polymers to produce oriented films which do not exhibit a tendency to fibrillate. Another object is to provide relatively highly oriented, tough polyacrylonitrile film. Still another object is to provide biaxially oriented, tough polyacrylonitrile film. The foregoing and additional objects will more clearly appear from the description which follows.

These objects are realized by the present invention which, briefly stated, comprises dispersing an acrylonitrile polymer in the form of discrete particles having a size less than about 15 microns in a liquid medium comprising water and a solvent metal salt for said polymer dissolved therein, the said salt being present in an amount such that the molar ratio of polymer (calculated as an equal weight of monomer) to solvent metal salt is at least 0.5 but less than 6, but in an amount insufficient to form a salt solution which dissolves said polymer; forming the resulting dispersion into the shape of a film; evaporating water from said film until coalescence occurs; stretching the resulting film containing the salt and water in a gaseous atmosphere to elongate at least one dimension of the film while maintaining the molar ratio of polymer to salt in the film within the range of at least 0.5 and less than 6 and maintaining the mole per cent water between about 30 and 80; and thereafter washing salt from the resulting stretched film and drying said stretched film while maintaining said film under tension to restrict dimensional change of the film during washing and drying. It should be understood that the "mole per cent water" is expressed in terms of the sum of the mole percentages of water, salt and polymer, the total equaling 100%.

The present invention resides in the discovery that highly oriented, tough polyacrylonitrile films may be prepared in accordance with the process defined hereinabove. The term "tough," as applied to these films, means that they not only have relatively high tensile strength as measured in both directions of stretch, but the films have a relatively high impact strength and a water vapor permeability which is considerably below that for unoriented films. This is highly surprising in view of the inherent brittleness of unoriented polyacrylonitrile films, and the extreme tendency of polyacrylonitrile films stretched in one direction to fibrillate.

From a theoretical aspect, structure studies on polyacrylonitrile film have indicated a fundamental difference between the behavior of films from this polymer and other types of polymeric films which can be readily stretched in two mutually perpendicular directions in an essentially dry state at normal or somewhat elevated temperatures. It has been theorized that the difficulty in stretching polyacrylonitrile film in two mutually perpendicular directions arises because the polymer chains tend to pack into fibrils. Hence, the film readily stretches in one direction, and it fibrillates when attempts are made to stretch the film in a direction perpendicular to the first direction of stretch. In practicing the present invention, it has been found that films of acrylonitrile polymers may be stretched in two mutually perpendicular directions to form a relatively highly oriented structure when the film is in such a state that the basic fibril packing unit cannot form. The process of the present invention, as defined hereinabove, leads to the formation of a coalesced film in a state where the basic packing unit does not form.

Structural changes taking place in polyacrylonitrile film during stretching have been followed by observing X-ray diffraction patterns resulting from impinging X-rays in directions (1) perpendicular to the plane of the film, (2) parallel to the plane of the film and impinging onto an edge of the film running parallel to one direction of stretch and (3) parallel to the plane of the film and impinging upon an edge running parallel to the other direction of stretch.

The toughness of the ultimate film produced by biaxial stretching of the film, when the films is in a state where its basic packing unit cannot form, i.e., in the form of a homogeneous film containing polymer/solvent metal salt/water, depends upon attaining a highly oriented molecular arrangement which is indicated by examination of X-ray diffraction patterns resulting from the diffraction of X-rays directed parallel to the plane of the film and onto each edge of the film extending in a direction parallel to each direction of stretch. A positive measure of the level of orientation is the measurement of orientation angle, wherein the lower the value of the orientation angle, the higher is the level of orientation. A description of the measurement of orientation angle is presented hereinafter.

It has been discovered, in accordance with the present invention, that biaxial stretching of polyacrylonitrile films in a state producible in accordance with the present process, i.e., where the basic fibril packing unit cannot form, leads to the formation of an unusually tough (i.e., high tensile strength and impact strength) polyacrylonitrile film having orientation angles no greater than 80° when these orientation angles are measured in both of two mutually perpendicular directions in the plane of the film using an X-ray beam impinging onto an edge of the film.

An analysis of the significance of the differences between corresponding (i.e., taken at the same X-ray beam angle) X-ray diffraction patterns, indicates a fundamental difference in the arrangement of polymer chains in polyacrylonitrile films stretched in one direction and those stretched biaxially. Wide angle X-ray diffraction patterns obtained by directing the X-ray beam (1) perpendicular to the plane of a film, stretched 6× in one direction, (2) parallel to the plane of the film and against an edge parallel to the direction of stretch, and (3) parallel to the plane of the film and against another edge perpendicular to the first edge, indicate that the polymer chains are lying in the plane of the film and parallel to the direction of stretching. An analysis of wide angle X-ray diffraction patterns of film stretched 3× (where × is the original dimension) in two mutually perpendicular directions indicates that the polymer chain alignment is different in the film stretched biaxially. In this film the polymer chains are arranged parallel to the plane of the film, and the polymer chains are randomly oriented in the plane of the film.

The process of the present invention is desirably applicable to the formation of tough, oriented polyacrylonitrile films formed from relatively high molecular weight polymers of acrylonitrile, i.e., polymers having an inherent viscosity of at least 1.2 (at 30° C. and a concentration of 0.1%, by weight, in dimethyl sulfoxide). It should be understood, however, that the present invention is not only applicable to homopolymers of acrylonitrile, but also to copolymers of acrylonitrile with up to 15–25% of at least one other vinyl-type (i.e., ethylenically unsaturated) monomer copolymerizable therewith. Other vinyl monomers copolymerizable with acrylonitrile include styrene, acrylic and alkacrylic ester monomers such as the alkyl acrylates and alkyl alkacrylates (e.g., methyl acrylate, ethyl acrylate and methyl methacrylate), methacrylonitrile, vinyl stearate, vinyl acetate, vinyl chloride and compounds selected from the class consisting of vinylarenesulfonic acids and their water-soluble salts (disclosed in British 765,585), N-vinyl pyrrolidone, 2-methyl-5-vinyl pyridine and other monomers disclosed in U.S. Patents 2,436,926 and 2,456,360.

The solvent salts used in preparing the dispersions of this invention are water-soluble metal salts. These salts should be sufficiently soluble in water to yield 10% solutions, and preferably at least 30% solutions. Furthermore, concentrated aqueous solutions of the salts must be capable of dissolving the acrylonitrile polymers at some temperature up to the boiling point of the salt solution, e.g., from 0°–175° C. and generally at 25°–90° C.

The solubility of the polymer in a concentrated aqueous solution of the solvent metal salt may be determined by placing 0.1 gram of the finely divided polymer in 10 milliliters of concentrated aqueous salt solution and stirring the mixture with heating, if necessary, and observing whether the polymer balls up to a coherent mass and/or passes into solution. Soluble, low molecular weight polymers tend to pass rapidly into solution, while soluble high molecular weight polymers absorb the salt solution and coalesce before slowly passing into solution.

Salts that meet the foregoing test are then used in the preparation of the coalescible dispersions. For this purpose, the concentrations of the aqueous salt solutions are kept below those at which the polymer will pass into solution as described above.

Included among the salts which may be used are lithium thiocyanate, lithium iodide, lithium bromide, sodium thiocyanate, sodium iodide, potassium thiocyanate, magnesium thiocyanate, calcium thiocyanate, calcium iodide, calcium bromide, calcium nitrate, manganese thiocyanate, zinc thiocyanate, zinc iodide, zinc bromide, zinc chloride, cadmium iodide and the like. The salts operable for use in the present process are, in general, found among the water-soluble thiocyanates, iodides, bromides and chlorides of Groups I and II metals of Atomic No. 3–48 of the Periodic Table, or compatible mixtures of these salts. The metals in these groups are lithium, sodium, potassium, copper, rubidium, silver, beryllium, magnesium, calcium, zinc, strontium and cadmium. In addition, ferric chloride, bromide and iodide and silver nitrate are solvent metal salts for polyacrylonitrile.

The dispersions of this invention are stable and have compositions adjusted such that the molar ratio of polymer (calculated on the basis of an equal weight of monomer) to solvent salt is within the range 0.5–6 with water being present in amounts such that the mole percent water varies between 60–98%. The preferred dispersions, those which lead to the formation of well-coalesced film compositions consisting essentially of polymer/salt/water, which films are most readily stretchable to oriented film structures in the present process, vary in molar ratio of polymer (calculated on the basis of equivalent monomer) to salt between 0.8–3. In choosing the particular composition one will, of course, avoid combinations which will initially or prematurely give solutions rather than dispersions. For this reason, it is preferred to have at least 80 mole percent water in the dispersions (with the mole percent polymer again calculated on the basis of equivalent monomer). Such dispersions are most useful in a continuous process, where adequate control of the coalescence step is necessary. Upon evaporation of sufficient water at a temperature at which the polymer is soluble, the particles will then coalesce. This coalescence, which is probably due to change of the surface of the dispersed polymer particles to the solution state, is marked by an abrupt change from an opaque fluid or paste-like milk or mucilage to a clear material ranging in viscosity and appearance from a clear syrup to a clear, tough rubber, dependent on such factors as the molecular weight and concentration of the dissolved polymer and the water content.

In addition to water, solvent metal salt and polymer, the dispersions of this invention can contain dispersing agents, pigments, "non-solvent" salts, dyes, clays, silica, alcohol, acetone and similar materials frequently added to shaped articles, such as the films of the present invention.

The dispersions are readily prepared by mixing the finely divided polymer with aqueous salt solution in the amounts desired. The polymer should have a particle size less than about 15 microns, preferably 0.005–1.5 microns. Such sizes are obtained by mechanical means, such as by the use of micronizers, homogenizers, ball mills, and similar pulverizers, if the polymer used is not already in a finely divided state.

Suspensions of appropriately fine polymer as obtained from emulsion polymerization (in aqueous media) may be employed directly. The aqueous dispersions of polymer containing the dissolved metal salt are prepared at any convenient temperature that does not cause polymer solution or degradation, preferably at 0°–40° C. Low temperatures are employed in some cases to avoid precoalescence due to high local salt concentrations during mixing the polymer suspension with the salt solution.

To form the tough, oriented, polyacrylonitrile films of this invention, the present process must be carried out in the critical sequence of steps recited hereinbefore. The dispersions obtained are readily fluid, especially when the polymer concentration is less than about 25% by weight. They are readily employed in the preparation of shaped objects, such as the films of this invention. The steps involved in the preparation of films from the polymer dispersions include first shaping of the dispersion in the form of a film, such as by casting it on a plate in a thin layer. The plate may be any smooth surface which does not readily adhere to the film, such as glass, metals, polymers, coated paper, etc. Up to this state, the dispersion is a milky fluid of low viscosity.

The second step is the coalescence step in which the milky dispersion is transformed into a relatively clear film, which in most cases is relatively tough and rubbery. This step is accomplished by the removal of part of the water from the dispersion by evaporation. In coalescing the film compositions comprising polymers of acrylonitrile admixed with the solvent metal salt and water, coalescence may be carried out at room temperature or lower. Quite often, it is preferred to employ some heat to accelerate the rate of coalescence, and coalescence may be carried out at temperatures as high as 100° C. or higher depending upon the film thickness. Coalescence at elevated temperatures, of course, is necessary when a continuous film-forming process is employed and it is desired that the coalescence step consume a time on the order of a few seconds. With short contact times, the actual temperature achieved is relatively immaterial with respect to the degradation of the polymer.

The third step of the present invention involves stretching the film in one or two mutually perpendicular directions. To obtain the novel, tough, oriented films of this invention it is, of course, necessary to stretch the film in two mutually perpendicular directions to an extent of at least 1.5×, and preferably at least 2× up to 4× or more. Furthermore, it is preferred that the film be stretched to essentially the same extent in both directions. Stretching may be carried out simultaneously in two directions, or the film may be stretched sequentially, that is, first in one direction and then in a direction perpendicular to the first direction of stretch. Stretching may be carried out on any conventional apparatus known to the art, but it is critical that stretching be effected in a gaseous atmosphere which will not change the proportions of polymer/salt/water in the coalesced film outside of the preferred composition limits for said coalesced film during stretching. The physical characteristics of the film structure resulting after coalescence are markedly dependent upon the composition of said structure. In order to have tough, rubbery coalesced films which are capable of significant molecular orientation upon stretching, the mole percent water in said structures must be held between 30 and 80, preferably between 35 and 80, and the molar ratio of polymer (calculated on the basis of equivalent monomer) to salt must be within the range of 0.5–6, preferably between 0.8 and 3. Use of higher ratios of polymer to salt results in poor coalescence and films which are stiff and therefore difficult to stretch, while the use of lower ratios results in coalesced films which lack the required strength to be stretched. The concentration of water in the film to be stretched and during stretching may actually vary within relatively wide limits, as may be noted from the limits specified. The greater the concentration of water in the film to be stretched, in general, the greater the ease of stretching, although at excessively high water contents, the efficiency of molecular orientation during stretching is impaired. The ease of stretching a film containing lower concentrations of water may be enhanced by stretching at somewhat elevated temperatures. Preferably, stretching is carried out in humid air wherein the relative humidity is about 30% at room temperature. Actual stretching conditions will depend, however, upon such variables as polymer concentration, type of polymer, rate of stretch, etc.

The fourth step involves washing the solvent metal salt from the stretched film. It is critical in order to obtain polyacrylonitrile films having a high level of orientation, to wash the oriented film while the film is maintained under tension to restrict dimensional change in the directions of stretch. Washing preferably is carried out in water, and preferably within the range of 0°–30° C.

It is also critical that the fifth step of the present process be carried out under tension to restrict dimensional change in the directions of stretch. This step involves drying the film to remove water to the point of equilibrium under the conditions of drying. As illustrated in the examples to follow, drying may be carried out at essentially room temperature, but higher temperatures up to 60° C. may be employed to facilitate completion of this step.

In the following examples which serve to further illustrate the process and products of the present invention, the physical and structural properties of the polyacrylonitrile films are measured in accordance with the following tests.

PNEUMATIC IMPACT STRENGTH

Pneumatic impact strength is the energy required to rupture a film. It is reported in kilogram-centimeters/mil of thickness of the film sample. Pneumatic impact strength is determined by measuring the velocity of a ball mechanically accelerated by air pressure, first in free flight and then in a flight impeded by rupturing the test film sample. In this test, the film sample is 1¾″ x 1¾″. The projectiles are steel balls ½″ in diameter and weighing 8.3 grams. The free flight ball velocity is 40±2 meters per second. The velocities are measured by timing photoelectrically the passage of the steel balls between two light beams set a definite distance apart. The pneumatic impact strength is measured by the loss in kinetic energy due to the rupturing of the film sample. It is calculated from the following formula:

Constant × (square of velocity in free flight
    minus square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

TENSILE STRENGTH, ELONGATION, INITIAL TENSILE MODULUS

These measurements are determined at 23° C. and 50% relative humidity. They are determined by elongating the film sample [1] at a rate of 100% per minute until the sample breaks. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at an elongation of 1%; both tensile strength and initial tensile modulus are based upon the initial cross-sectional area of the sample.

MOISTURE PERMEABILITY OR INITIAL PERMEABILITY VALUE (IPV)

The measurement of moisture permeability is determined by placing the film over the top of an aluminum cup containing 15 milliliters of water, the test area being 33.3 square centimeters. The assembly is weighed accurately and then placed in a dry (less than 3% relative humidity) air-swept oven at 39.5° C. for 48 hours. The assembly is removed from the oven, permitted to cool to room temperature and reweighed. The weight loss is converted to grams of water lost/100 m.$^2$/hour/mil of film thickness. The values given in the examples are the grams of water lost/100 m.$^2$/hour/mil for the second 24 hour period.

---
[1] Samples were cut with a Thwing-Albert cutter which cut samples ¼″ wide.

DENSITY

The density of the film specimen is measured by placing the specimen in a liquid column exhibiting a density gradient. The level at which the film comes to rest is compared to standards of known density. The density of the film specimen is obtained by interpolation between the levels of the density standards. With the films of this invention, a suitable density gradient is prepared by mixing heptane and carbon tetrachloride.

DIMENSIONAL STABILITY (PERCENT SHRINKAGE AT ELEVATED TEMPERATURES)

The shrinkage of a film sample (upon exposure to an elevated temperature) was obtained by measuring the length of a strip of film before and after exposure to a given temperature (140° C.) in an oven for a time of at least 15 minutes. The film samples were placed in the oven under no restraint, and the actual temperature of the oven was measured at a point of close proximity to the film specimen.

MEASUREMENT OF WIDE ANGLE X-RAY DIFFRACTION PATTERNS

The wide angle X-ray diffraction pattern is obtained as follows. The diffraction sample is mounted as described below in a flat plate camera having sample to recording photographic film distance of 2.5 centimeters. A beam of nickel-filtered copper K-alpha radiation is directed through the center of the diffraction specimen and perpendicular to the plane of the recording photographic film. Using the Model XRD-5 X-ray diffraction apparatus, manufactured by the General Electric Co., the X-ray tube is operated at 16 milliamps and 50 kilovolts, and the X-ray beam is collimated by passage through two successive pin holes of diameter 0.025 inch, which are spaced three inches apart in the collimator. Excessive blackening of the photographic film due to the undiffracted portion of the incident beam is prevented by the use of a flattened circular lead beam stop 0.6 mm. in diameter which is mounted adjacent to said film, being positioned at the center of the diffraction pattern so as to intercept the undiffracted beam. When the diffraction pattern is obtained with the incident beam perpendicular to the plane of the film diffraction specimen (herein described as "perpendicular" or "transmission" exposures), the film diffraction specimen is prepared by stacking successive layers of the film, all having the same orientation relative to one another with respect to the stretch axes of the film, to a thickness of 0.050 inch. This film diffraction specimen is then mounted in the camera in a manner such that the plane of the film layers is perpendicular to the diffraction beam. When the diffraction pattern is obtained with the beam parallel to the plane of the film diffraction specimen (herein described as "edge-wise" or "edge" exposures), a strip of film is first cut parallel to one of the axes of stretch, then this is folded upon itself in a zig-zag fashion in such a manner that a relatively thick edge (greater than the diameter of the incident X-ray beam) is provided. The width of said strip of film in the direction of the incident beam is 0.020 inch. Where said patterns are to be used in determination of orientation angle, the time of exposure is adjusted so that the maximum optical density of the photographic image on the negative resulting after development according to conventional procedures is between 0.7 and 0.9.

ORIENTATION ANGLE

The measurement of orientation angle indicates the degree of alignment of polymer chains parallel to the plane of the film specimen. For a biaxially stretched film, which has been stretched to essentially the same extent in two mutually perpendicular directions, no orientation effects are detectable in an X-ray diffraction pattern taken with the X-ray beam directed perpendicular to the plane of the film. This indicates that the polymer chains are randomly oriented with respect to rotation within the plane of the film, and therefore with respect to the X-ray beam. On the other hand, if the diffraction pattern is obtained with the beam parallel to the plane of the film, wherein the X-ray beam is directed onto an edge of the film, distinct orientation effects can be seen since the polymer chains are preferentially oriented parallel to the plane of the film, and therefore the formerly continuous circular diffraction rings are now broken into discontinuous arcs, which tend to subtend smaller angles as the orientation is increased. Such an X-ray diffraction pattern is obtained by cutting a strip of film parallel to one of the axes of stretch and folding the strip of film upon itself in a zig-zag fashion (as described under "Measurement of Wide Angle X-Ray Diffraction Pattern") so that a relatively thick edge is provided.

This sample is then mounted in an X-ray apparatus so that the beam passes parallel to the plane of the film and one edge of the film, but perpendicular to the other film edge.

Figure 1B:
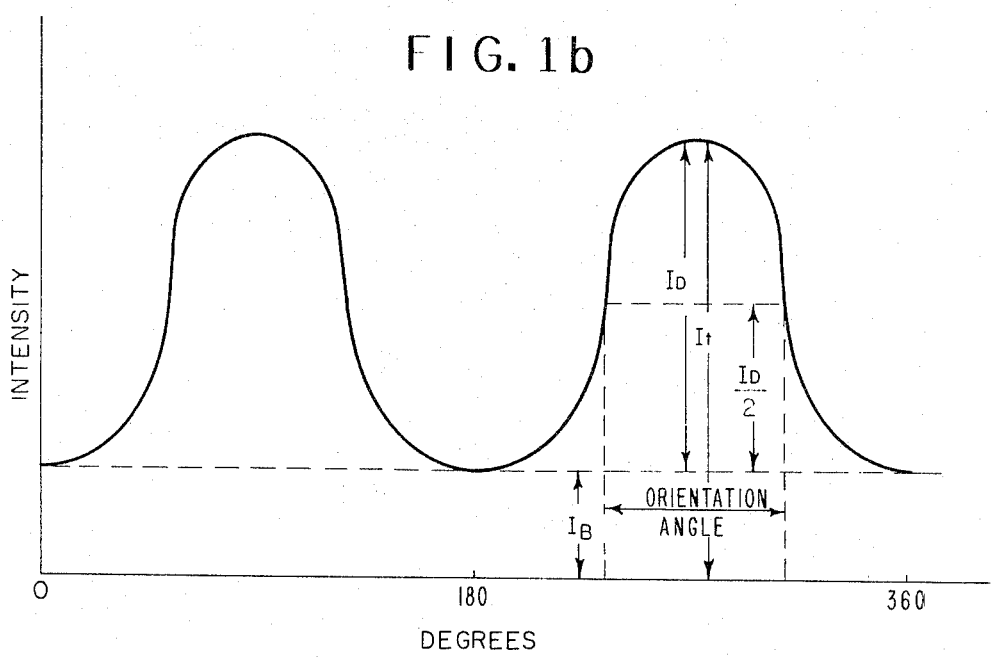

A quantitative measure of the degree of orientation is obtained by determining essentially the length of one of the arcs on the X-ray diffraction pattern. This is done by making a circular densitometer trace around the ring diffraction pattern using the principal reflection, which occurs at a Bragg angle $2\theta$ of approximately 17°. Such a trace is shown in FIGURE 1B wherein the symbol $I_t$ represents total intensity; $I_B$ represents background intensity; and $I_t$ minus $I_B$ is the intensity of scattering due to diffraction represented by the symbol $I_D$, i.e., $I_D = I_t - I_B$. Orientation angle is defined as the width of the peak in FIGURE 1B at half the maximum intensity. This half width is measured in terms of the number of degrees in the central angle which subtends the arc at the points indicated in FIGURE 1A, which illustrates a typical wide angle X-ray diffraction pattern. Thus, a high degree of orientation is indicated by relatively low orientation angles, and an orientation angle of 180° (or for practical purposes, greater than 100°) indicates no orientation in the film sample.

INHERENT VISCOSITY

The inherent viscosity, a relative measure of molecular weight, is defined as follows. A solution containing 0.05 gram of polyacrylonitrile per 100 milliliters of dimethyl sulfoxide is prepared by dissolving the polymer in vacuum distilled dimethyl sulfoxide containing less than 0.05% water (by weight) using high speed stirring for 60 minutes with the solution maintained at 100° C. The resulting solution is cooled to room temperature, then 6 milliliters of said solution are transferred to an Ostwald-Fenske viscometer, Series 75. The viscometer is next placed in a thermostat maintained at 30° C., and the polymer solution is allowed to flow through the capillary of the viscometer. The efflux time is taken as the time required for the meniscus of the solution to pass between the two calibration points of the capillary. This process is repeated until successive efflux times agree to within 0.2%. The average of said efflux times is taken as $t_s$, the solution time. An equal volume of pure solvent which has been subjected to an identical stirring and heating cycle is run through the viscometer using the same procedure, in order to obtain $t_o$, the solvent time. The quotient of solution time divided by solvent time ($t_s/t_o$) is defined as the relative viscosity. The inherent viscosity is defined as being equal to the natural logarithm of the relative viscosity divided by the solution concentration expressed as grams/100 milliliters.

*Example 1*

An aqueous dispersion of polyacrylonitrile was prepared from the following ingredients:

0.10 part of potassium persulfate
1.0 part of sodium lauryl sulfate 120.0 parts of water
80.0 parts of acrylonitrile The above substances were placed in a bottle capable of containing 350 parts of water and the free space of the bottle flushed with nitrogen gas and the bottle sealed. After mixing the contents by relatively mild agitation of the bottle for 16–17 hours at 40° C., the resultant polymer dispersion contained 38.6% solid material as determined by evaporation of a portion of the dispersion at 60° C.

To 160 parts of the above polymer dispersion at −4° C. there was added with stirring 240 parts of 28.33% aqueous calcium thiocyanate solution at −7° C. The mole percentages of polymer (calculated as monomer), salt and water in the resultant dispersion were 7.0, 2.6 and 90.4, respectively. Films were prepared by casting the resultant dispersion at room temperature as a coating on a glass plate. As the dispersion coating was partially dried, it was transformed by coalescence into a clear, tough, rubbery coating which was stripped in air at about 25° C. and 50% relative humidity. Portions thereof were treated further by the following techniques with the results indicated:

(a) A coalesced film was immersed in water until free of salt, then dried at room temperature. A clear film resulted.

(b) A second coalesced film was washed and dried as in (a), then was drawn by immersing it in boiling water and extending its area in two dimensions, as much as possible without tearing, in the plane of the film; the film was then removed and dried. A clear, tough film resulted. A similar result was obtained without drying before immersion in boiling water.

(c) A third coalesced film was drawn in the room air by extending it in two dimensions in the plane of the film. While held in extended condition, it was next contacted with water at room temperature and washed free of salt. It was found advantageous for optical perfection to keep the film taut during washing and drying. After drying, a clear, tough film was obtained that had a tensile strength of 22,000 p.s.i.

In the following examples, dispersions of polyacrylonitrile in aqueous solutions of the solvent metal salt were prepared in accordance with the following procedure:

120 parts (735 grams) of distilled water were mixed with 80 parts (492 grams) of distilled acrylonitrile monomer. To this was added one part (5.9 grams) of sodium lauryl sulfate and 0.1 part (0.6 gram) of potassium persulfate, dissolved in 20 milliliters of water. This mixture which was stirred slowly at 35° C. overnight under nitrogen pressure formed a stable polymeric dispersion of colloidal nature during that period. The amount of solids in the dispersion was found to be 38.1%, and the inherent viscosity of the polymer formed was 7.71 measured at 0.1% concentration in dimethyl sulfoxide at 30° C.

To this dispersion, which amounted to 1210 grams, was added 1815 grams of a calcium thiocyanate solution containing 29.3% calcium thiocyanate. Addition of the calcium thiocyanate to the dispersion caused it to agglomerate, and the polymeric material was redispersed by stirring for about 21 hours. Following this, the dispersion was filtered through a coarse sintered glass funnel and deaerated under vacuum. The resultant dispersion had mole percentages of polymer (calculated as monomer), salt and water equal to 11.0, 4.3 and 84.7, respectively.

*Example 2*

A portion of the dispersion of polyacrylonitrile, prepared as above described, was doctored onto a glass plate to form a cast film of about 5 mils in thickness. This film was coalesced at 70° C. for 5–10 minutes. The plate containing the cast film was placed in a water bath at room temperature, and after the calcium thiocyanate was extracted, the film was stripped off and allowed to remain in the water bath for a period of at least one hour. A number of film samples were prepared in this manner, and a sample of each was treated in the following manner:

(a) A wet film sample prepared as described above was dried in air at room temperature under tension in a frame for 24 hours. The properties of this film are as follows:

Density _____ 1.1713 g./cm.².
Pneumatic impact strength ____ less than 1 kg.-cm./ml.
Water vapor permeability _____ 249 g./100 m.²/hour for a 0.66 mil film.
Initial tensile modulus _____ 630,000 p.s.i.
Elongation _____ 5%.
Tensile strength _____ 13,800 p.s.i.

(b) A second wet film was dried without tension at room temperature for 10 days. Qualitatively, the film appeared fairly tough, and was as clear as (a) above. The physical properties of this film were as follows:

Pneumatic impact strength _____ less than 1 kg.-cm./mil.
Initial tensile modulus _____ 549,000 p.s.i.
Elongation _____ 2%.
Tensile strength _____ 10,200 p.s.i.

*Example 3*

This example illustrates stretching a wet, non-salt-containing polyacrylonitrile film in hot or boiling water. Coalesced films, about 5 mils in thickness, were prepared as in Example 2 by coalescing the film at about 70° C. for 5–10 minutes. The plate containing the cast film was placed in a water bath at room temperature, and after sufficient calcium thiocyanate was extracted, the film was stripped from the plate. A number of film samples were treated in the following manner:

(a) One film was allowed to dry unrestrained in room air overnight. The resulting dried film was so brittle that it cracked when attempts were made to clamp it in a machine stretcher. Hence, this film sample could not be stretched because of its extremely brittle nature.

(b) A second film was not dried after stripping from the plate, but was stored in water until ready for stretching. The wet, relatively pliable film was clamped in a machine stretcher. Water was poured into a container surrounding the film, and the water was brought to a boil by means of external heating. At this point the stretcher clips were pulled apart simultaneously in two mutually perpendicular directions. The film turned opaque and broke at the clips only after a slight extension. The film was then removed and dried in room air. The dried film was extremely brittle.

(c) A wet film of the type prepared in (b) was clamped in a machine stretcher, surrounded by boiling water as in (b), and the film was stretched sequentially instead of simultaneously. An elongation of approximately 2× was achieved in the first direction of stretch. Essentially no elongation could be effected in the second direction of stretching before the film ruptured. The final, dried film was brittle, and tended to fibrillate on creasing or flexing.

*Example 4*

Portions of the polymeric dispersion prepared as described above were cast in thicker sections and coalesced on glass plates to form films containing polymer/salt/water of about 50 mils. After coalescence, the films were stored at 50% relative humidity until they became rubbery and could be readily removed from the glass plates. Analysis showed that the films contained mole percentages of polymer (calculated as monomer), salt and water equal to 20.2, 8.0 and 70.8, respectively.

These films were stretched in a machine stretcher simultaneously in two mutually perpendicular directions.

All of the films were stretched in air (about 30–50% relative humidity) at a temperature within the range of 25°–40° C. The films prior to stretching were 5¼" x 5¼". In the machine stretcher, stainless steel clips approximately 2" long with ½" serrated jaws were used to clamp the film in the machine. Three such clips were attached to each side of the film, and blotting paper was used to insulate the film from the jaws of the clips. Each set of 3 clips on each side of the film was connected to motor-driven stretcher bars. The stretcher bars on opposite sides of the film were then pulled apart to achieve simultaneous biaxial stretching. The connecting arms of the stretcher were shaped like inverted U's so that the film while held by the clips could be placed in a galvanized metal pan approximately 2" in depth. After the film was stretched to the desired extent in both directions, the stretcher was stopped and maintained in position to hold the film under tension, and then water was poured into the pan until the film became totally immersed. In this manner, the solvent metal salt was extracted from the film while it was in its extended state. After 4 or 5 minutes extraction, the films were removed and placed in frames to keep the films under tension and thereby restrict dimensional change in the direction of stretch. The frames consisted of stainless steel squares made from strips of metal approximately 1" in width, and the films were held in place in the frames by means of clamps. The stretched films, clamped in this manner, were then extracted for an additional hour in water at room temperature.

After extraction, to remove essentially all of the solvent metal salt, excess water was removed from the surface of the films and the films were allowed to dry in the clamps under tension in room air for a period of 28–48 hours prior to measuring the physical properties and structural characteristics of the film.

Table I summarizes the physical properties and structural characteristics of films stretched 2.2× by 2.2× and 3× by 3×. The values are essentially the same when measured in either direction of stretch.

TABLE I

| Physical Property | Stretch Ratio | |
|---|---|---|
| | 2.2× | 3× |
| Orientation Angle, degrees | 80 | 63 |
| Pneumatic Impact Strength (kg.-cm./mil) | 1.4 | 5.0 |
| Tensile Strength (p.s.i.) | 18,200 | 24,900 |
| Percent Elongation | 59 | 42 |
| Initial Modulus (p.s.i.) | 588,000 | 638,000 |
| Percent Shrinkage at 140° C | 9.0 | 12.0 |
| Water Vapor Permeability (g./100 m.²/hr. for 1 mil film) | | 76 |
| Density (g./cm.³) | 1.1765 | 1.1666 |

The impact strength of the oriented films produced in accordance with the foregoing examples is measured, as described hereinbefore, at 23° C. and 50° relative humidity. When the impact test is measured at 23° C. and 0% relative humidity, wherein the tested specimens are conditioned for 24 hours at 0% relative humidity and 23° C., the impact strength is reduced by a factor of about 2. The sensitivity of the impact strength of the oriented films to the presence of moisture is caused by the relatively high void content of the films which allows the film to absorb a relatively large amount of water, and hence the water serves to plasticize and toughen the structure. In normal usage, therefore, in atmospheres of at least 40% relative humidity at essentially room temperature, the relative toughness of the films produced in accordance with this invention is accurately reflected in the impact test described hereinbefore.

The oriented films of this invention are useful in a wide variety of applications, particularly for preparing laminations with other base materials. Laminations for exterior uses include laminations to wood, metal, cloth and to these materials in the form of a metallized film. End uses for such laminates include: chairs, bench tops, doors, house siding and roofing, curtain wall panels, signs, vehicle trim, vending machines, awnings, baby carriages, tarpaulins and reflector signs.

Laminates for interior use include lamination to the above substrates including elastomeric substrates. Specific end uses for such interior laminations employing the acrylonitrile polymer films of this invention include: baseboard trim, cabinets, table tops, appliances (inside and outside), dry-all battery coverings, serving trays, counter tops, decorative wall coverings, flooring, metallic yarn, book covers, wall paper, radiant heating panels, fuel cells and thermal insulation.

As a base material for other uses the film may be employed as a cap liner or closure, in battery separators, as a base material for metallizing, by vacuum metallizing or other techniques, as a base for printed circuits, as a base material for magnetic, pressure-sensitive, computer and video tapes, as an underground cable sheathing and as a structural component in refrigerator insulation.

I claim:
1. A film of a polymer selected from the group consisting of polyacrylonitrile and copolymers of acrylonitrile and at least one other vinyl monomer copolymerizable therewith said copolymers containing at least 75% by weight of acrylonitrile, said polymer having an inherent viscosity of at least 1.2 at 30° C., in dimethyl sulfoxide at a concentration of 0.1% by weight; said film exhibiting an oriented structure in X-ray diffraction patterns resulting from impinging X-rays onto any edge of the film, said film having orientation angles no greater than 80° when said orientation angles are measured in both of two mutually perpendicular directions in the plane of the film using an X-ray beam impinging onto an edge of the film.

2. A film of polyacrylonitrile having an inherent viscosity of at least 1.2 at 30° C., in dimethyl sulfoxide at a concentration of 0.1% by weight, said film exhibiting an oriented structure in X-ray diffraction patterns resulting from impinging X-rays onto any edge of the film, said film having orientation angles no greater than 80° when said orientation angles are measured in both of two mutually perpendicular directions in the plane of the film using an X-ray beam impinging onto an edge of the film, said film having a pneumatic impact strength of at least 2 kg.-cm./mil measured at 23° C. and 50% relative humidity.

References Cited by the Examiner

UNITED STATES PATENTS

| | | | |
|---|---|---|---|
| 2,417,293 | 3/1947 | D'Alelio | 18—57 |
| 2,514,195 | 7/1950 | Kuhn | 260—88.7 |
| 2,558,730 | 7/1951 | Cresswell | 18—57 |
| 2,631,334 | 3/1953 | Bailey | 18—57 |
| 2,648,648 | 8/1953 | Stanton et al. | 260—88.7 |
| 2,684,348 | 7/1954 | Dietrich et al. | 18—57 |
| 2,786,043 | 3/1957 | Schuller et al. | 18—57 |
| 2,846,727 | 8/1958 | Bechtold | 18—57 |

JOSEPH L. SCHOFER, *Primary Examiner.*

DONALD E. CZAJA, *Examiner.*

H. WONG, *Assistant Examiner.*